United States Patent [19]

Kodama et al.

[11] Patent Number: 4,555,799

[45] Date of Patent: Nov. 26, 1985

[54] METHOD FOR INSPECTING CRIMP BONDED TERMINALS

[75] Inventors: Hiroaki Kodama, Osaka; Tetsuo Kubo, Kyoto; Sinkichi Miwa, Yokkaichi, all of Japan

[73] Assignee: Sumitomo Electric Industries, Ltd., Japan

[21] Appl. No.: 544,817

[22] Filed: Oct. 24, 1983

[51] Int. Cl.[4] ............................................. G06K 9/00
[52] U.S. Cl. ........................................ 382/8; 250/563
[58] Field of Search ....................... 356/376, 377, 394; 250/559, 562, 563, 571, 572, 560

[56] References Cited

U.S. PATENT DOCUMENTS 3,112,150 11/1963 Hammell .
4,343,553 8/1982 Nakagawa et al. .................. 250/560

FOREIGN PATENT DOCUMENTS 57-60249 4/1982 Japan .................................... 250/563
58-135440 8/1983 Japan .................................... 250/562

Primary Examiner—Leo H. Boudreau
Assistant Examiner—Michael M. Murray
Attorney, Agent, or Firm—Ernest A. Beutler

[57] ABSTRACT

In an improved method for inspecting crimp bonded terminals, instead of inspecting visually, contour images of crimp bonded terminals are picked up and scanned to provide necessary data and processing operations are performed on the data to make a decision automatically on the acceptance or rejection of the crimp bonded terminals, thereby elevating the inspection efficiency and improving the accuracy of deciding the acceptance or rejection of the crimp bonded terminals.

8 Claims, 25 Drawing Figures

METHOD FOR INSPECTING CRIMP BONDED TERMINALS

The present invention relates to a method for inspecting crimp bonded electric terminals which have been crimp bonded to sheathed electric wires.

In crimp bonding an electric terminal to a sheathed electric wire, it is necessary that an end portion of a sheathing layer of the sheathed electric wire is removed and a bared core of the sheathed electric wire is placed at a proper position within a core crimping portion of the terminal and crimped by a crimping barrel of the terminal and an end portion of an unbared sheathing layer of the wire is suitably held by a sheathing crimping portion of the terminal. If this working operation is not performed properly, failures are apt to occur in the course of subsequent assembling of electric components or connectors employing the electric wires and also it is difficult to obtain products provided with satisfactory electrical and mechanical properties.

For example, if the core crimping portion crimps a core and simultaneously an end portion of a sheathing layer of a wire the latter of which would be left still after the removing operation (hereinafter referred to as an excessive sheathing crimping failure), both of a crimping force and contact area between the core and the core crimping portion would become insufficient thereby failing to ensure satisfactory electric properties.

On the contrary, if the sheathing layer of a wire is held only by a part of the sheathing crimping portion with the other part of the sheathing crimping portion being opposite to the core of the wire (hereinafter referred to as an incomplete sheathing crimping failure), a holding force of the sheathing crimping portion applied onto the sheathing layer of the wire becomes insufficient thereby causing breakage of the core due to vibrations transmitted thereto from the sheathing layer and at the same time the core end is shifted backward simultaneously with the backward shift of the sheathing layer of the wire thereby causing the core to be crimped only by a part of the core crimping portion with the resulting deterioration of electric properties.

On the other hand, in a case where the core comprises a large number of core wires and a part of the core wires stray out of the core crimping portion (hereinafter referred as a stray core wire failure), such a failure is apt to cause deterioration of electric properties due to a reduction of a holding force applied onto the core and also it gives rise to an obstacle to the insertion of the terminal into a connector case. Heretofore, since it has been impossible to detect the above-mentioned failures only through a continuity test conducted between the core and the terminal, there has been no other measure better than relying on visual inspection.

It is an object of the present invention to provide an inspection method which, instead of visual inspection, obtains an image of an article under test and performs computing operations on the data obtained with respect to the image of the article thereby to effect automatic discrimination between the acceptance and rejection of the article.

Since each of the core of the wire and the terminal is made of a metal, there occurs frequently halation of a contour image of such metallic portions in the image formation process. Moreover, since the pattern of halation changes irregularly in accordance with the manner of illumination or a slight change of the condition of an object to be imaged, with conventional recognition techniques, it has been impossible to attain clear recognition of such a contour image of the metallic portions.

A primary feature of this invention resides in the fact that even if an image of the metallic portions subjected to halation shows a considerably nonuniform distribution, a contour image of a crimp bonded terminal may be utilized as effective image information for the purpose of pattern recognition. More precisely, from the results of the working of this invention it has been found that sufficient image information may be obtained from a lateral contour image of an article to be inspected, namely, a crimp bonded terminal in this case, which is taken by viewing the terminal in a direction substantially perpendicular to the direction of application of crimping pressure to the terminal. It has been revealed from this fact that the inspection as to whether a crimping operation has been effected satisfactorily can be effected completely if only a lateral contour image of the terminal is obtained, even if some degree of halation should exist in the image.

Another feature of this invention resides in the fact that it has been found desirable in performing the terminal crimping operation and also useful in raising the accuracy of the discrimination between the acceptance and rejection of a terminal under inspection to read automatically the position of a predetermined corner point on the periphery of a contour image of a sheathing crimping portion within the image of the terminal, to determine the corner point as a measurement reference point and to utilize the measurement reference point so as to measure an amount of displacement, from the measurement reference point, of a pattern obtained within predetermined discriminating regions, thereby making a decision on the acceptance or rejection of the terminal.

Still another feature of this invention resides in the fact that, as an example of making a decision as to whether a cut end of a sheathing layer of a wire under inspection is present in an intermediate region between the sheathing crimping portion and the core crimping portion of the wire, it is possible to make a decision on the acceptance or rejection of the wire by detecting a density inversion boundary within the intermediate region and determining whether the measured co-ordinates of the density inversion boundary in the vertical and horizontal directions fall within the intermediate region.

A further feature of this invention resides in the fact that, with respect to a failure of a portion of core wires forming the core straying out of the core crimping portion of a terminal under inspection, it is possible to decide whether a stray core wire failure has occurred by scanning a predetermined area where a stray core wire failure is apt to occur usually and determining the presence or nonpresence of an extraneous substance, namely, a density inversion image indicative of the extraneous substance in the predetermined area.

A still further feature of the invention resides in the fact that according to the inspecting method of this invention it is possible to determine whether the dimensions of the sheathing crimping portion and the core crimping portion of a terminal after the portions have been crimped are within predetermined specification limits.

The above and other features of this invention will become more apparent from the following description of this invention taken in conjunction with the accompanying drawings.

Figure 3A:
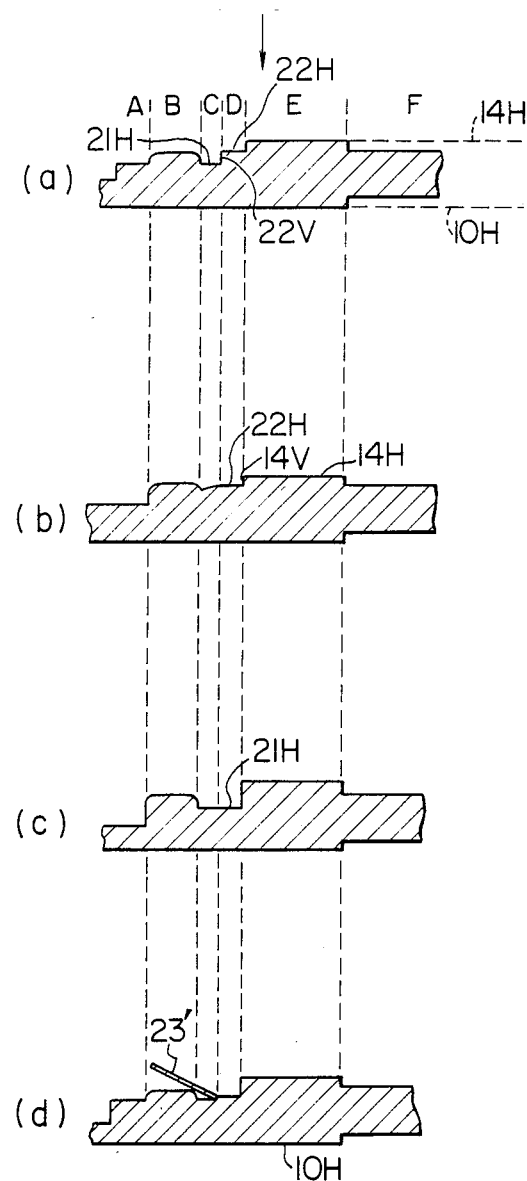

(a), (b), (c) and (d) of FIG. 3A are explanatory drawings illustrating respective lateral contour images of acceptable and rejectable crimp bonded terminals obtained by the inspecting method of this invention.

Figure 3B:
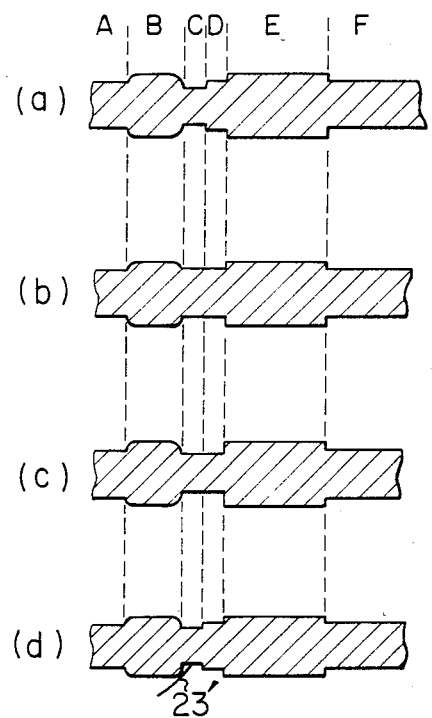

(a), (b), (c) and (d) of FIG. 3B are explanatory drawings illustrating respective top view contour images of acceptable and rejectable crimp bonded terminals obtained by the inspecting method of this invention.

FIGS. 4a, 4b, 4c and 4d are explanatory drawings useful for illustrating the manner of determining the reference lines and reference point for measuring a lateral contour image of a crimp bonded terminal obtained by the inspecting method of the invention.

Figure 5A:
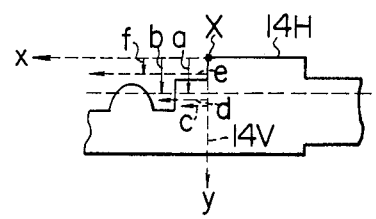
Figure 5B:
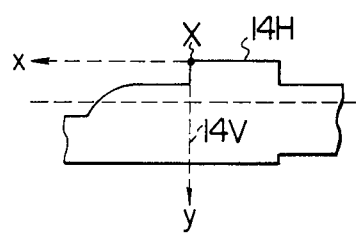
Figure 5C:
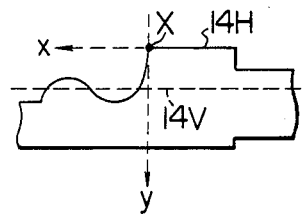

FIGS. 5a, 5b and 5c are explanatory drawings useful for illustrating the measurement and computing operations for deciding the acceptance or rejection of terminals under inspection from respective lateral contour images of acceptable and rejectable crimp bonded terminals obtained by the inspecting method of this invention.

FIGS. 6a to 6i are explanatory drawings useful for illustrating various steps in the measurement and processing operations for deciding the acceptance or rejection of terminals under inspection from respective lateral contour images of crimp bonded terminals obtained by the inspecting method of this invention, in addition to the illustrations of FIGS. 5a, 5b and 5c.

Figure 7:
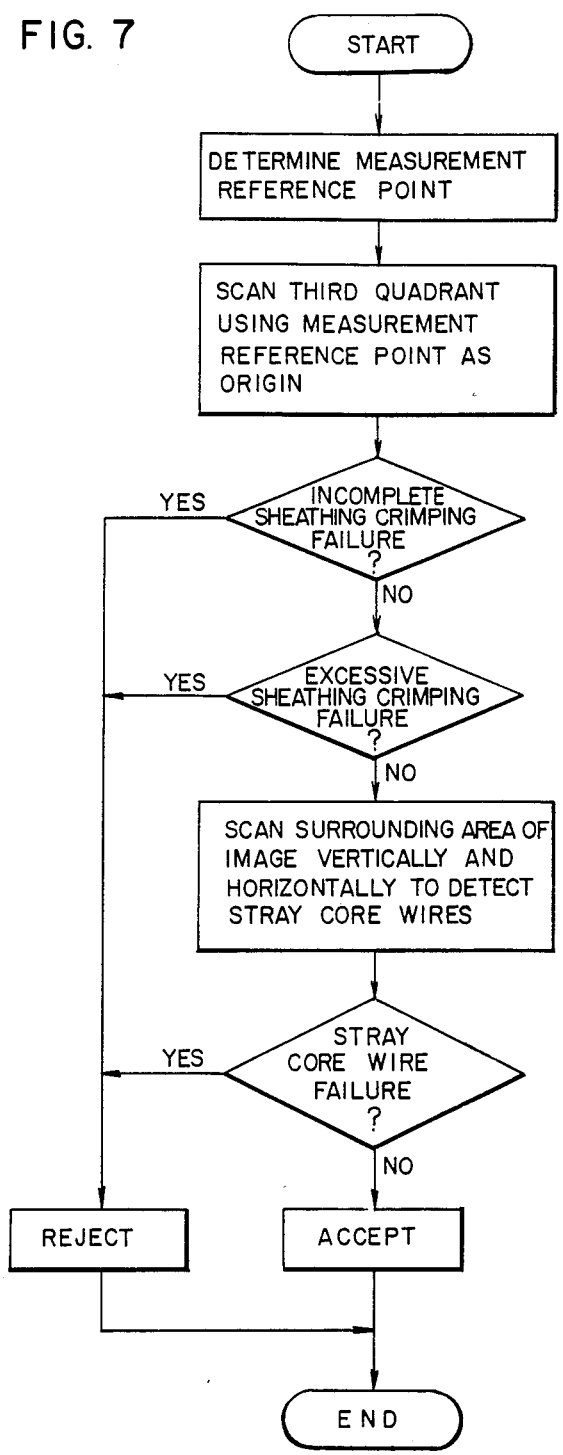

FIG. 7 is a flowchart illustrating, by way of example, the processing steps in the processing operations performed by the inspecting method of this invention.

Preferred embodiments of this invention will be described hereinafter with reference to the accompanying drawings.

Figure 1A:
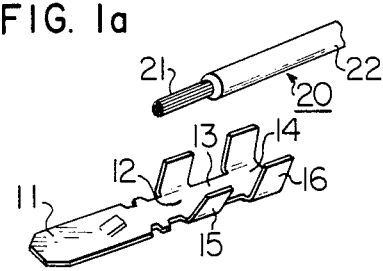
FIGS. 1a and 1b are perspective views schematically showing by way of example the construction of a publicly known crimp bonded terminal.
Figure 1B:
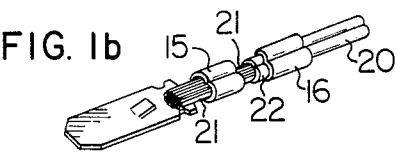

A crimp terminal shown in FIG. 1a comprises an electrode portion 11, a core crimping portion 12, a sheathing crimping portion 14 and an intermediate portion 13 intervening between the core crimping portion 12 and the sheathing crimping portion 14. The electrode portion 11 may be a tonque-shaped male terminal end as shown in the Figure, or alternatively it may be a female terminal end adapted for engagement with a male terminal end such as mentioned above. Also, it may be a doughnut-shaped electrode, namely, a so-called LA terminal, through which a bolt is inserted and fastened with a nut, or it may be a connector part for connection to an end of a lead wire of an electric component. As disclosed in Japanese Patent Publication No. 39-15915 or its corresponding basic U.S. Pat. No. 3,112,150, the core crimping portion 12 comprises a base portion and a wire barrel 15 extending from both sides of the base portion to take a U-shape, thereby forming a so-called open barrel. A core 21 is applied onto the base portion through the open end of the U-shaped wire barrel 15 and then the wire barrel 15 is pressed from outside by a crimping die (not shown) so that the wire barrel 15 is deformed forcibly with its end portions biting into the core 21 thereby to complete electrical connection (FIG. 1b). On the other hand, the sheathing crimping portion 14 comprises a sheathing barrel 16, which is usually similar in shape to but somewhat greater in size than the wire barrel 15, and usually the sheathing barrel 16 is deformed by being forcibly pressed from outside by the crimping die simultaneously with the core crimping operation so as to surround and firmly hold a sheathing layer 22 of a sheathed wire 20 (FIG. 1b).

Figure 2A:
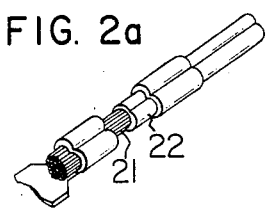
FIGS. 2a to 2d are perspective views, with FIG. 2a showing an acceptable crimp bonded terminal and FIGS. 2b, 2c and 2d showing rejectable crimp bonded terminals by way of example.
Figure 2B:
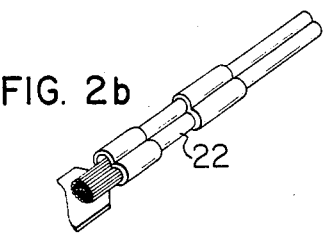
Figure 2C:
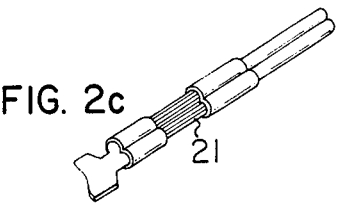
Figure 2D:
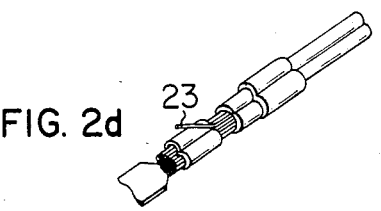

FIGS. 2a to 2d show various states of the crimp bonded terminals resulting from the terminal crimping operation performed by using the crimping die. In the Figures, FIG. 2a shows an acceptable state, FIG. 2b an excessive sheathing crimping failure, FIG. 2c an incomplete sheathing crimping failure, and FIG. 2d a stray core wire failure caused by a stray core wire 23.

Referring now to FIG. 3A, an arrow shown there indicates a direction of application of the crimping pressure by the crimping die and the hatched patterns in the Figure show respectively lateral contour images (silhouttes) of crimp bonded terminals obtained in a direction substantially normal to the direction of the arrow. In obtaining those lateral contour images, a bright background is provided in the rearward of each crimp bonded terminal viewed front ways in FIG. 3A and a magnifying image pickup device is positioned on the front side. In this way, the lateral contour images of terminals as shown in FIG. 3A can be obtained. In the lateral contour image of the crimp bonded terminal shown in (a) of FIG. 3A, a zone A indicates a lateral contour image part of the electrode portion 11, a zone B a lateral contour image part of the core crimping portion 12, zones C and D the lateral contour image parts of the intermediate portion 13, a zone E a lateral contour image part of the sheathing crimping portion 14, and a zone F a lateral contour image part of the sheathed wire 20. The lateral contour image of an acceptable terminal shown in (a) of FIG. 3A is featured in the presence of a step 22V between a core region 21H and a sheathing region 22H in the C and D zones. In the case of the excessive sheathing crimping failure shown in (b) of FIG. 3A, there is a feature such that the sheathing region 22H is extending to reach the zone B. In the case of the incomplete sheathing crimping failure shown in (c) of FIG. 3A, there is a feature such that the core region 21H is extending to reach the zone E. In the case of the stray core wire failure shown in (d) of FIG. 3A, there is a feature such that the a density inversion image 23' is present above the lateral contour image in any one or ones of the zones B, C and D.

As will be seen from FIG. 3A, since the sheathing barrel 16 is deformed by crimping with a preset combination of anvil and die so that it surrounds and holds the sheathing layer of the sheathed wire 20, a contour line 14H of the sheathing crimping portion within the zone E is substantially parallel to a contour line 10H of the terminal base lower surface with a fixed height maintained therebetween. For example, even in the case of the incomplete sheathing crimping failure shown in (c) of FIG. 3A where the sheathing layer is not present at all within the zone E, the die is not allowed to go down beyond predetermined spots and positions and its working surface is preset to be parallel to the terminal base lower surface indicated by the contour line 10H. Thus, the parallelism and height between the contour lines 14H and 10H have very high reproducibility. As will be apparent from FIG. 3A, the zones E and F contain very little information which is of use in making a decision on the acceptance or rejection of the terminals. However, images contained in the zones A, B, C and D including and neighboring the core crimping portion 12, when taking a corner 14V of the lateral contour image of the sheathing crimping portion 14 on the side of the core crimping portion 12 shown in FIG. 3A as a reference point, contain plenty of information useful for deciding the acceptance or rejection of the terminals under inspection. It is possible to find the corner 14V appearing at the boundary between the zones D and E in most of the lateral contour images. Therefore, by making an analysis of the images in the zones A, B, C and D to the left of the zone E in FIG. 3A, it is possible to obtain information necessary for making a decision on the acceptance or rejection of the terminals under inspection from the lateral contour images. Thus, the inspection method of this invention utilizes the corner 14V as a measurement reference point for the inspection of terminals to decide the acceptance or rejection thereof.

On the other hand, FIG. 3B shows top view contour images of crimps bonded terminals seen in the direction of the arrow shown in FIG. 3A.

In FIG. 3B, zones A, B, C, D, E and F correspond respectively to the counterpart zones shown in FIG. 3A and show contour image parts of the corresponding portions of crimp bonded terminals, respectively. Shown in (a) of FIG. 3B is the top view contour image of an acceptable terminal. Shown in (b) of FIG. 3B is a terminal having an excessive sheathing crimping failure. In this case, there appears no step between the zones C and D but a straight and thicker contour image. Shown in (c) of FIG. 3B is a terminal having an incomplete sheathing crimping failure. In this case, there appears no step between the zones C and D but a straight and thinner contour image. Shown in (d) of FIG. 3B is a terminal under a stray core wire failure involving a stray core wire image 23′ straying in a direction perpendicular to the paper plane in the illustration of FIG. 3A.

Also in FIG. 3B, since a pressing force is applied to the anvil through a predetermined movement of the crimping die, the parallelism and height between both peripheries of the contour image in the zone E have a high degree of reproducibility in the same way as the case of FIG. 3A.

Next, an image processing method used by the inspection method of this invention will be explained. Firstly, a magnified lateral image signal of a crimp bonded terminal is obtained through an image pickup device, e.g., an image sensor or vidicon camera using picture elements of 256×256, for example. Generally, it is desirable to process an image by a rotational processing method so that the terminal base lower surface 10H shown in FIGS. 4a to 4d may appear in parallel with the horizontal direction on the display screen of a monitor having picture elements of 256×256. While, for the purpose of raising the inspection speed, it will facilitate the processing operations to arrange the terminal base lower surface 10H to be parallel to the horizontal direction on the display screen directly by hardware without resorting to the rotational processing by software.

Figure 4A:
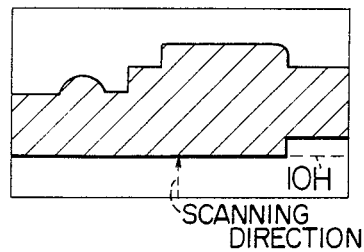
Figure 4B:
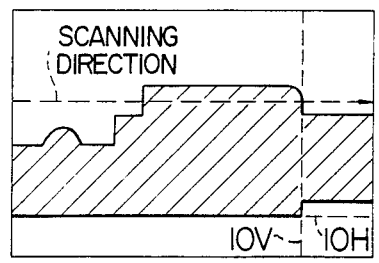
Figure 4C:
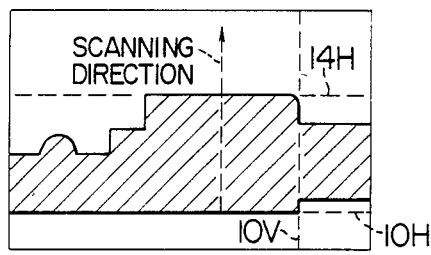
Figure 4D:
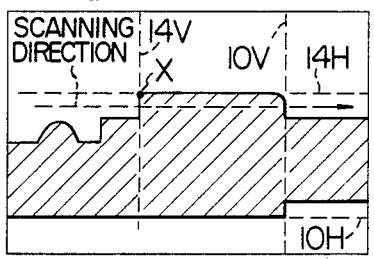

Firstly, it is necessary to detect the intersection X of the reference lines 14V and 14H as a preliminary step for performing the measurement of the pattern of the image. Since the terminal base lower surface 10H shown in FIG. 4a is a boundary where the image changes from light to dark when it is scanned upwardly from the lower end of the measurement area, a horizontal line detecting filter is used to detect a boundary where a transition from light to dark occurs, and the number of picture elements lying in the vertical direction from the lower end of the measurement area to the boundary is read, and then the position of the reference line 10H is determined by a maximum value obtained from a histogram of the read numbers of picture elements. In FIG. 4b, a filter is used to detect the position of a vertical line, across which a transition occurs from dark to light, in the horizontal scanning from left to right in the measurement area at a height of a predetermined number of picture elements from the reference line 10H, and then, by obtaining a maximum value from a histogram of the results of the processing operations, it is possible to determine the position of a reference vertical line 10V. In FIG. 4C, the use of a horizontal line detecting filter to survey an area upward from the reference line 10H through a predetermined number of picture elements reveals a transition from dark to light across the reference line 14H. Thus, a histogram is obtained from the positions of the transition points from dark to light detected by the horizontal line detecting filter, and it is utilized to determine the reference line 14H. Then, in FIG. 4d, the reference line 14V is detected by the use of a vertical line detecting filter for surveying horizontally from left to right at a height slightly lower than the reference line 14H. Thus, the measurement reference point X may be determined as the intersection X of both reference lines 14H and 14V.

Then, the steps of inspection of crimps bonded terminals will be explained.

In FIG. 5a (showing the case of an acceptable crimp bonded terminal), the left lower (third) quadrant of the measurement area seen from the measurement reference point X as the origin is scanned and inspected. As the start of the inspection steps, the reference lines 14H and 14V passing through the intersection X are respectively selected as the x and y axes. Since the dimensions of a crimp bonded terminal are predetermined according to its type, a plurality of vertical lines each thereof having a predetermined length, such as shown at a and b, are drawn respectively from predetermined positions on the x axis 14H, and the density of the image at each of the forward end positions of the vertical lines is examined. In a like manner, a plurality of horizontal lines each thereof having a predetermined length, such as shown at c and d, are drawn respectively from predetermined positions on the y axis 14V, and the density of the image at each of the forward end positions of the horizontal lines is examined. In accordance with the state of the density of the image at the forward end positions of the vertical and horizontal lines, a decision is made on the acceptance or rejection of crimp bonded terminals under inspection. Through such inspection steps it is possible to decide the presence or nonpresence of such failures as an excessive sheathing crimping failure and an incomplete sheathing crimping failure shown in FIGS. 5b and 5c, respectively.

With respect to the inspection of stray core wires, it is possible to decide the presence or nonpresence of a stray core wire failure by scanning similarly vacant areas surrounding the image with a desired number of horizontal and vertical lines e and f each thereof having a predetermined length thereby to check the presence or nonpresence of a density inversion image there.

Further, several examples of the inspection method according to the embodiments of this invention will now be described with reference to FIGS. 6a to 6i.

Figure 6A:
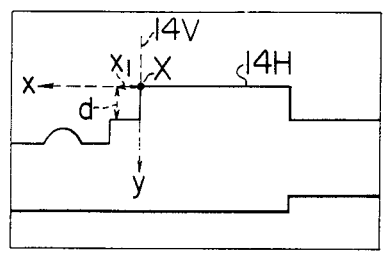

FIG. 6a shows a step in which a vertical line apart leftward from the axis y through a predetermined number of picture elements $x_1$ is drawn and a vertical distance d from the axis x to a point where the image changes from white to black is detected.

Figure 6D:
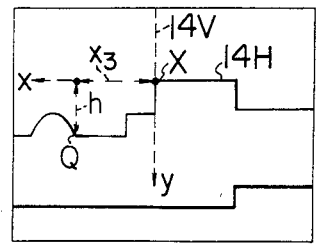
Figure 6B:
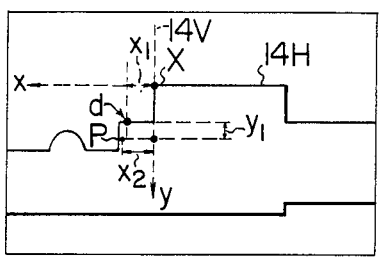

FIG. 6b shows a step in which a vertical line apart leftward from the axis y through a predetermined number of picture elements $x_1$ is drawn to reach a point d where the image changes from white to black and then a horizontal line is drawn passing through a point, which is advanced further downward from the point d through a predetermined number of picture elements $y_1$, and extending leftward from the axis y through a predetermined number of picture elements $x_2$, thereby to reach a point P, and then the image density at the point P is examined. If the image at the point P is black, the crimp bonded terminal under inspection is decided to be acceptable. On the other hand, if the image at the point P is white, the point P is in a vacant space and the crimp bonded terminal under inspection is decided to have a shape such as shown in FIG. 6c.

FIG. 6d shows a step in which a vertical line apart leftward from the axis y through a predetermined number of picture elements $x_3$ is drawn, and a distance h from the axis x to a point Q where the image changes from white to black is examined.

Figure 6E:
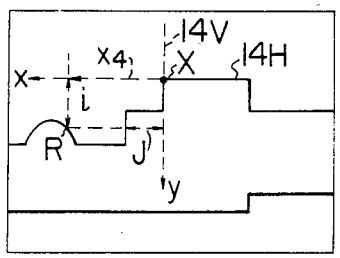
Figure 6C:
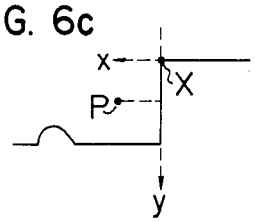

FIG. 6e shows a step in which a vertical line apart leftward from the axis y through a predetermined number of picture elements $x_4$ is drawn, and a distance i from the axis x to a point R where the image changes from white to black is examined. Then, scanning is effected along a horizontal line which is lower than the axis x by the distance i and extends from the axis y to the point R, and a horizontal length j of the black image area is measured.

Figure 6F:
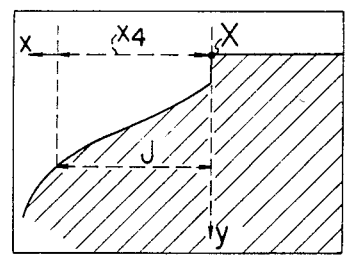
Figure 6G:
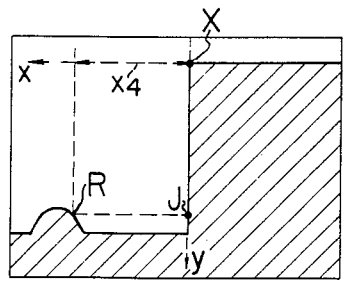

If the result of the inspection shown in FIG. 6e indicates $J=x_4$, for example, as shown in FIG. 6f, it is decided that the crimp bonded wire under inspection has an excessive sheathing crimping failure. If the result of the step shown in FIG. 6e indicates $J=0$ indicating that the area J is not present, for example, as shown in FIG. 6g, it is often the case that an incomplete sheathing crimping failure is present.

Figure 6H:
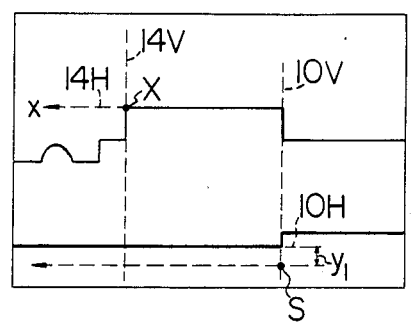
Figure 6I:
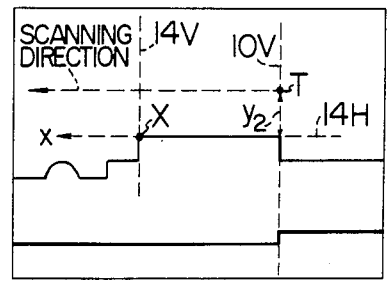

While a method for detecting the presence of a stray core wire failure has been referred to in the description of the inspection step shown in FIG. 5a, FIGS. 6h and 6i illustrate another method for detecting the presence of a stray core wire failure over a broader area surrounding a crimp bonded terminal.

In the step shown in FIG. 6h, a distance over 160 picture elements is scanned leftward starting from a point S which is positioned on the reference line 10V below the reference line 10H through $y_1$ picture elements. In this case, if the scanning encounters any black image representing a stray core wire image, an existing distance from the point S is measured and further an examination of the continuity of the black image is effected around the detected point thereon by additional scanning. As the result of the scanning, it is possible to decide the presence or nonpresence of a stray core wire failure. If no black image is encountered in the scanning, it is decided that no stray core wire failure is present.

FIG. 6i show a step similar to the step shown in FIG. 6h, in which a distance over 160 picture elements is scanned leftward starting from a point T which is positioned on the reference line 10V above the reference line 14H through $y_2$ picture elements. In this case, if the scanning encounters any black image representing a stray core wire image, an existing distance from the point T is measured and further an examination of the continuity of the black image is effected around the detected point thereon by additional scanning, thereby making a decision on the presence or nonpresence of a stray core wire failure. If no black image is encountered in the scanning, it is decided that no stray core wire failure is present.

FIG. 7 shows an example of a flowchart illustrating the processing operations performed in the crimp bonded terminal inspection method according to the above-described embodiments of the invention.

While the foregoing illustration and description of the crimp bonded terminal inspection method according to the embodiments of this invention are directed to the case where lateral contour images of crimp bonded terminals are picked up in a direction substantially perpendicular to the direction of application of crimping pressure, by way of examples, which case facilitates the layout of the terminal crimping machine and tool and the inspection equipment, the inspection method according to this invention is not limited to the above-mentioned case, but it may be accomplished by effecting the inspection on contour images picked up in the same or opposite direction with respect to the direction of application of crimping pressure.

Further, it is possible to improve the inspection efficiency by the use of the arrangement such that, upon completion of the inspection steps of this invention, an apparatus for displaying or informing the result of the inspection and/or an apparatus for sorting acceptable and rejectable crimp bonded terminals are automatically brought into operation.

From the foregoing description, it will be seen that by virtue of the above-described various features of the crimp bonded terminal inspection method of this invention comprising the steps of picking up contour images of crimp bonded terminals, performing processing operations on the data obtained by scanning the contour images and automatically deciding the acceptance or rejection of the crimp bonded terminals in accordance with the results of the processing operations, the inspection method of this invention makes it possible to overcome the difficulties in the conventional visual inspection thereby elevating the inspection efficiency and to improve greatly the accuracy of making a decision on the acceptance or rejection of the crimp bonded terminals. Thus, the inspection method of this invention can provide remarkable effects in industrial applications.

We claim:

1. In a method for inspecting a sheathed wire crimp bonded terminal, comprising a sheathed wire having an end portion of a bared core of a sheathed wire obtained by removing a portion of said sheathing layer, said terminal crimping said core by a core crimping portion and said sheathing by a sheathing crimping portion, comprising the steps of obtaining a shadow image of a contour and a surrounding area thereof of said crimp bonded terminal by using an image pickup device, measuring the image of the contour and the surrounding area thereof of said crimp bonded terminal and performing processing operations on data obtained by the measurement, and making a decision on acceptance or rejection of said crimp bonded terminal in accordance with a result of the processing operations, said inspection method comprising the steps of selecting a predetermined corner on the periphery of the contour shadow image of said sheathing crimping portion of said crimp bonded terminal as a measurement reference point, scanning the shadow image of the contour and the surrounding area thereof of said crimped bonded terminal on the side of said core crimping portion thereof at preselected locations, determining coordinate values of density inversion boundary points in the image located by said scanning operation, and comparing the coordinate values of the density inversion boundary points in the image with respective predetermined acceptance values thereby to decide the acceptance or rejection of said crimp bonded terminal.

2. An inspection method according to claim 1, wherein the preselected locations are scanned along two intersecting measurement reference lines passing through said measurement reference point and selected as co-ordinate axes to determine co-ordinates of density inversion boundary points located in both horizontal and vertical directions in the area of said contour image on the side of said core crimping portion.

3. An inspection method according to claim 1, wherein the presence or nonpresence of a density inversion image in an outer area of an intermediate portion between said sheathing crimping portion and said core crimping portion in said contour image of said crimp bonded terminal is discriminated thereby to discriminate the presence or nonpresence of a piece of said sheathing layer there.

4. An inspection method according to claim 1, wherein an vacant area on a crimping pressure application side of said core crimping portion in said contour image of said crimp bonded terminal is scanned so as to discriminate the presence or nonpresence of a density inversion image in said vacant area, thereby discriminating the presence or nonpresence of a stray core wire failure there.

5. An inspection method according to claim 1, wherein said step of picking up a contour image of said crimp bonded terminal comprises picking up a lateral contour image of said crimp bonded terminal in a direction substantially perpendicular to a direction of application of crimping pressure to said core crimping portion.

6. An inspection method according to claim 2, wherein said step of picking up a contour image of said crimp bonded terminal comprises picking up a lateral contour image of said crimp bonded terminal in a direction substantially perpendicular to a direction of application of crimping pressure to said core crimping portion.

7. An inspection method according to claim 3, wherein said step of picking up a contour image of said crimp bonded terminal comprises picking up a lateral contour image of said crimp bonded terminal in a direction substantially perpendicular to a direction of application of crimping pressure to said core crimping portion.

8. An inspection method according to claim 4, wherein said step of picking up a contour image of said crimp bonded terminal comprises picking up a lateral contour image of said crimp bonded terminal in a direction substantially perpendicular to a direction of application of crimping pressure to said core crimping portion.

* * * * *